US009667888B2

(12) United States Patent
Shimosato

(10) Patent No.: US 9,667,888 B2
(45) Date of Patent: May 30, 2017

(54) IMAGE CAPTURING APPARATUS AND CONTROL METHOD THEREOF

(71) Applicant: CANON KABUSHIKI KAISHA, Tokyo (JP)

(72) Inventor: Jiro Shimosato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 14/575,163

(22) Filed: Dec. 18, 2014

(65) Prior Publication Data
US 2015/0181135 A1  Jun. 25, 2015

(30) Foreign Application Priority Data
Dec. 24, 2013 (JP) ................. 2013-266131

(51) Int. Cl.
H04N 5/272 (2006.01)
H04N 5/225 (2006.01)
H04N 5/232 (2006.01)

(52) U.S. Cl.
CPC ........... H04N 5/272 (2013.01); H04N 5/2258 (2013.01); H04N 5/23293 (2013.01); H04N 5/23219 (2013.01)

(58) Field of Classification Search
None
See application file for complete search history.

(56) References Cited

U.S. PATENT DOCUMENTS

2010/0157084 A1* 6/2010 Shimamura ........ G06K 9/00228
348/222.1
2014/0055656 A1* 2/2014 Mori ................... H04N 5/23293
348/333.02
2014/0118600 A1* 5/2014 Son ..................... H04N 5/23293
348/333.11
(Continued)

FOREIGN PATENT DOCUMENTS

JP 07-046564 A 2/1995
JP 2005-094741 A 4/2005
(Continued)

OTHER PUBLICATIONS

The above foreign patent documents were cited in the Sep. 8, 2016 Korean Office Action, which is unclosed without an English Translation, that issued in Korean Patent Application No. 10-2014-0183712.

Primary Examiner — Timothy J Henn
(74) Attorney, Agent, or Firm — Cowan, Liebowitz & Latman, P.C.

(57) ABSTRACT

An image capturing apparatus comprises a first image capturing unit, a second image capturing unit that is different from the first image capturing unit, and a control unit configured to perform control such that a second live image captured by the second image capturing unit is superimposed and displayed on a first live image captured by the first image capturing unit, wherein if first information is to be displayed on a display unit along with the first live image and the second live image, the control unit controls to switch (Continued)

a display state in which the first information is superimposed on the second live image or a display state in which the first information is displayed behind the second live image, according to a state of a predetermined function for shooting.

15 Claims, 10 Drawing Sheets

(56) References Cited

U.S. PATENT DOCUMENTS

| 2014/0192245 A1* | 7/2014 | Lee | H04N 5/23293 |
| | | | 348/333.05 |
| 2015/0124125 A1* | 5/2015 | Kim | H04N 5/2628 |
| | | | 348/239 |
| 2015/0163409 A1* | 6/2015 | Sakai | H04N 5/23293 |
| | | | 348/333.03 |
| 2015/0172552 A1* | 6/2015 | Kim | H04N 5/23293 |
| | | | 348/333.05 |

FOREIGN PATENT DOCUMENTS

| JP | 2007-129332 A | 5/2007 |
| JP | 2011-013243 A | 1/2011 |
| KR | 10-2007-0028244 A | 3/2007 |

\* cited by examiner

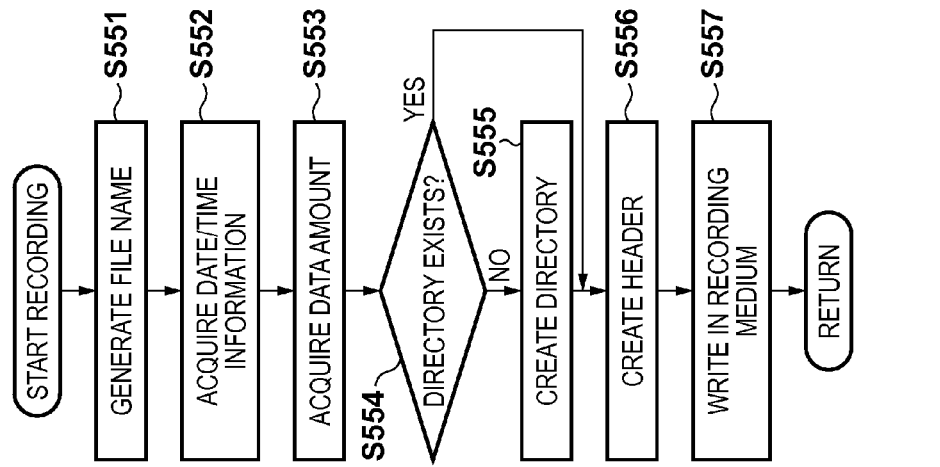
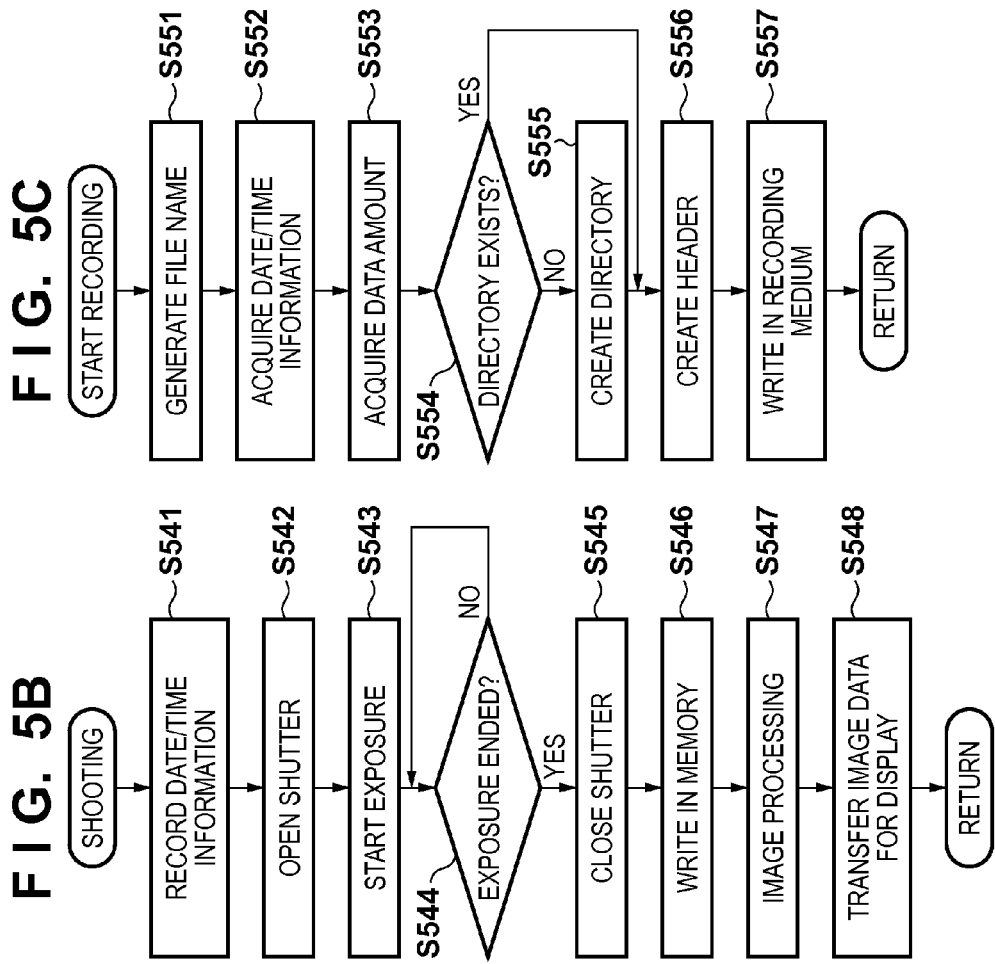
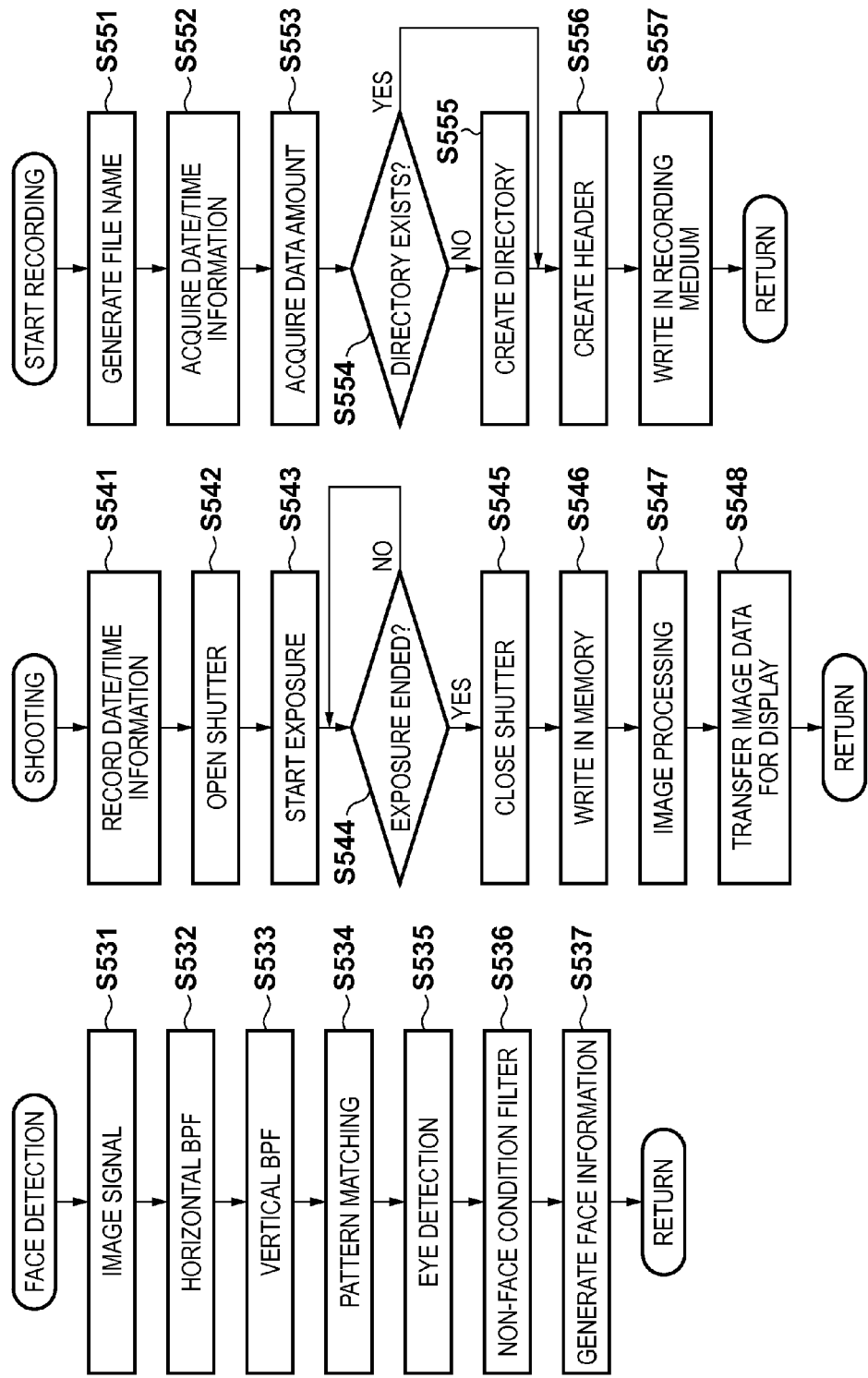

F I G. 9A
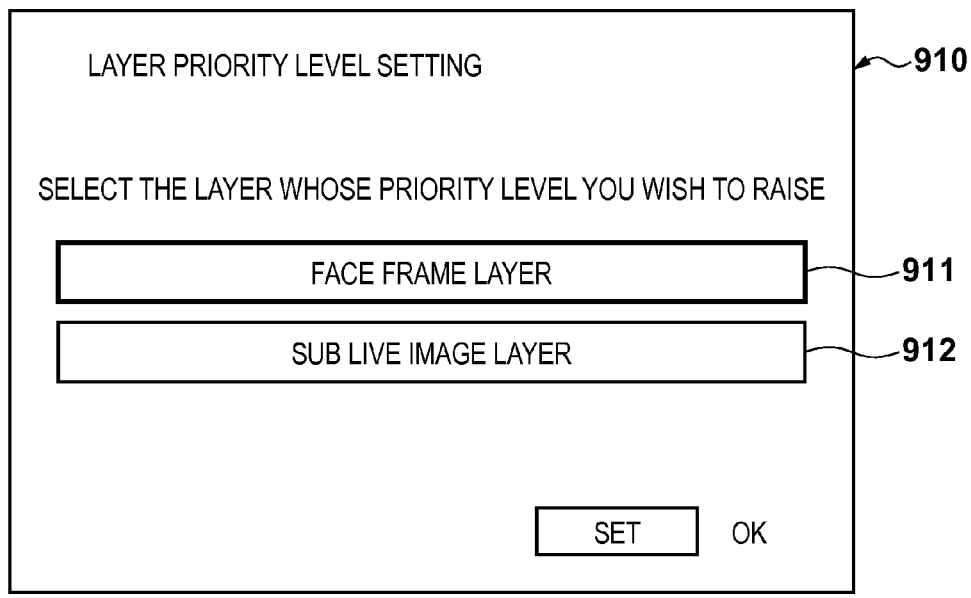
F I G. 9B
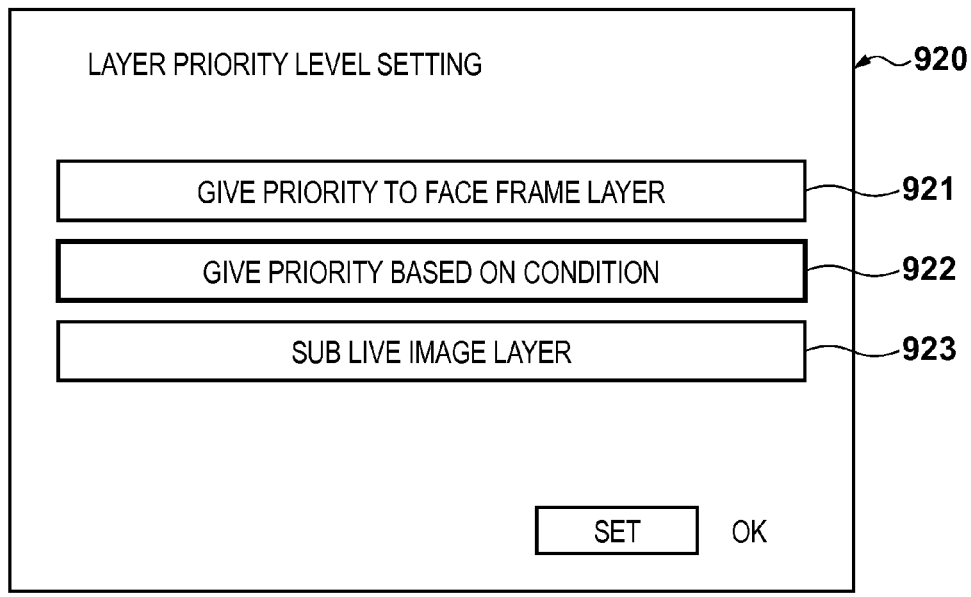

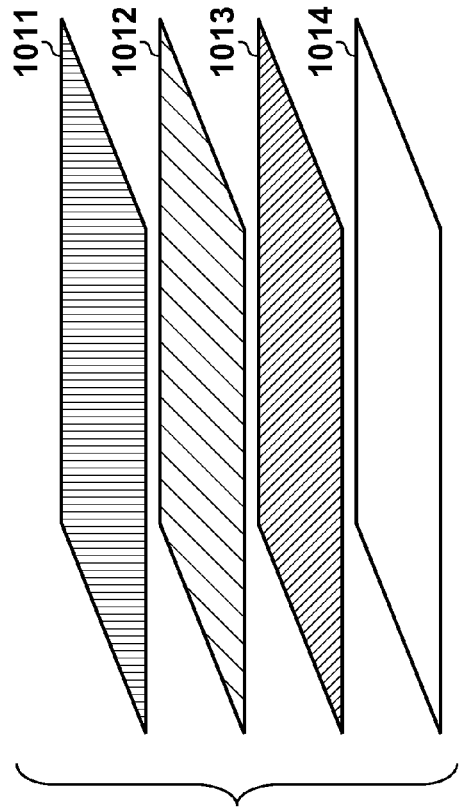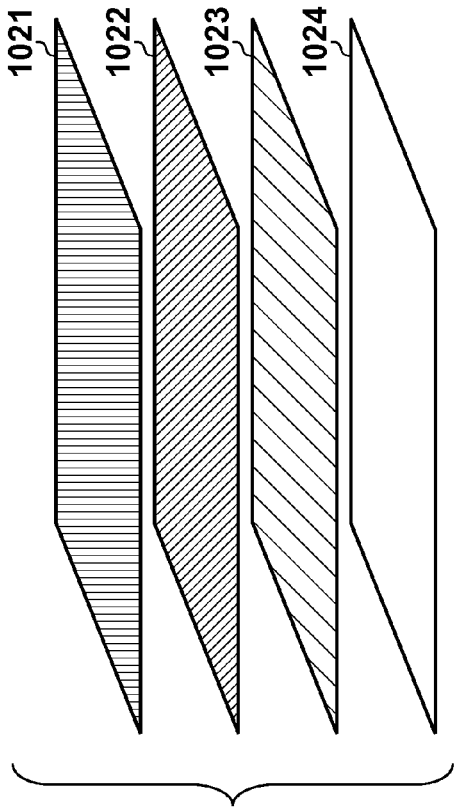

IMAGE CAPTURING APPARATUS AND CONTROL METHOD THEREOF

BACKGROUND OF THE INVENTION

Field of the Invention

The present invention relates to an image capturing apparatus having a plurality of image capturing units and control method thereof.

Description of the Related Art

Along with normal cameras that shoot an object seen by a photographer (main camera), cameras that shoot a photographer himself/herself or an object on the photographer side (sub camera) have been mounted in the latest mobile phones and smartphones. Also, by mounting a main camera and a sub camera, a so-called simultaneous shooting function is realized in which shooting is performed by the main camera and the sub camera at the same time and the images shot by the cameras are composited and recorded. Upon using the simultaneous shooting function, while viewing the live view images of the main camera and the sub camera, the user can check the expression and the like of the photographer in conjunction with the composition of the object and the like, and perform shooting.

An image obtained using the simultaneous shooting function is generally constituted by superimposing the image shot by the sub camera at a small size on a background region that is the image shot by the main camera. With regard to the simultaneous shooting function, Japanese Patent Laid-Open No. 2005-094741 discloses a technique of performing face detection on the image shot by the main camera and compositing the image of the photographer shot by the sub camera in a region not including a face, so that the object in the image shot by the main camera is not hidden.

In the case of performing shooting using the simultaneous shooting function, a composite image obtained by arranging the live view image from the sub camera on the background region that is the live view image from the main camera is subjected to through-the-lens display on an electronic view finder such as a liquid crystal panel. For this reason, the photographer can perform shooting while checking not only the object but also his/her own expression and the like.

However, in Japanese Patent Laid-Open No. 2005-094741, since the positional relationship between the image of the photographer and the image of the object, which are superimposed and displayed, is fixed, there is a possibility that the image of the photographer will be hidden by the image of the object, display of other information such as a focus frame, and the like, or the image of the object will be hidden by the image of the photographer, display of other information, and the like.

SUMMARY OF THE INVENTION

The present invention has been made in consideration of the aforementioned problems, and realizes a technique according to which, by switching the vertical positional relationship between an image and an information which are superimposed and displayed, according to the shooting state, an image can be displayed without being hidden by another image, information display, or the like.

In order to solve the aforementioned problems, the present invention provides an image capturing apparatus comprising: a first image capturing unit; a second image capturing unit that is different from the first image capturing unit; and a control unit configured to perform control such that a second live image captured by the second image capturing unit is superimposed and displayed on a first live image captured by the first image capturing unit, wherein if first information is to be displayed on a display unit along with the first live image and the second live image, the control unit controls to switch a display state in which the first information is superimposed on the second live image or a display state in which the first information is displayed behind the second live image, according to a state of a predetermined function for shooting.

In order to solve the aforementioned problems, the present invention provides a control method of a display control apparatus for displaying an image captured by a first image capturing unit and an image captured by a second image capturing unit for capturing an image in a direction different from that of the first image capturing unit, the method comprising: a control step of performing control such that a first live image captured by the first image capturing unit, a second live image captured by the second image capturing unit, and first information are displayed on the display unit, wherein in the control step, the second live image is superimposed and displayed on the first live image, and according to a state of a predetermined function related to shooting, it is controlled to switch a display state in which the first information is superimposed on the second live image or a display state in which the first information is displayed behind the second live image.

According to the present invention, by switching the vertical positional relationship between a plurality of images and an information which are superimposed and displayed, according to a shooting state, an image can be displayed such that it is not hidden by another image, information display, or the like.

Further features of the present invention will become apparent from the following description of exemplary embodiments with reference to the attached drawings.

BRIEF DESCRIPTION OF THE DRAWINGS

FIG. 5A is a flowchart showing face detection processing in step S407 in FIG. 4.

FIG. 5B is a flowchart showing shooting processing in step S414 in FIG. 4.

FIG. 5C is a flowchart showing recording processing in step S416 in FIG. 4.

FIGS. 9A and 9B are diagrams illustrating a layer priority setting screen in a simultaneous shooting mode according to an embodiment.

FIGS. 10A and 10B are diagrams illustrating a layer configuration in a simultaneous shooting mode according to an embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Embodiments upon application of the present invention to an image capturing apparatus such as a digital camera for shooting a still image and/or moving image will be described in detail hereinafter with reference to the drawings.

Apparatus Configuration

The configuration and functions of a digital camera according to this embodiment of the present invention will be described below with reference to FIGS. 1 and 2.

Figure 1:
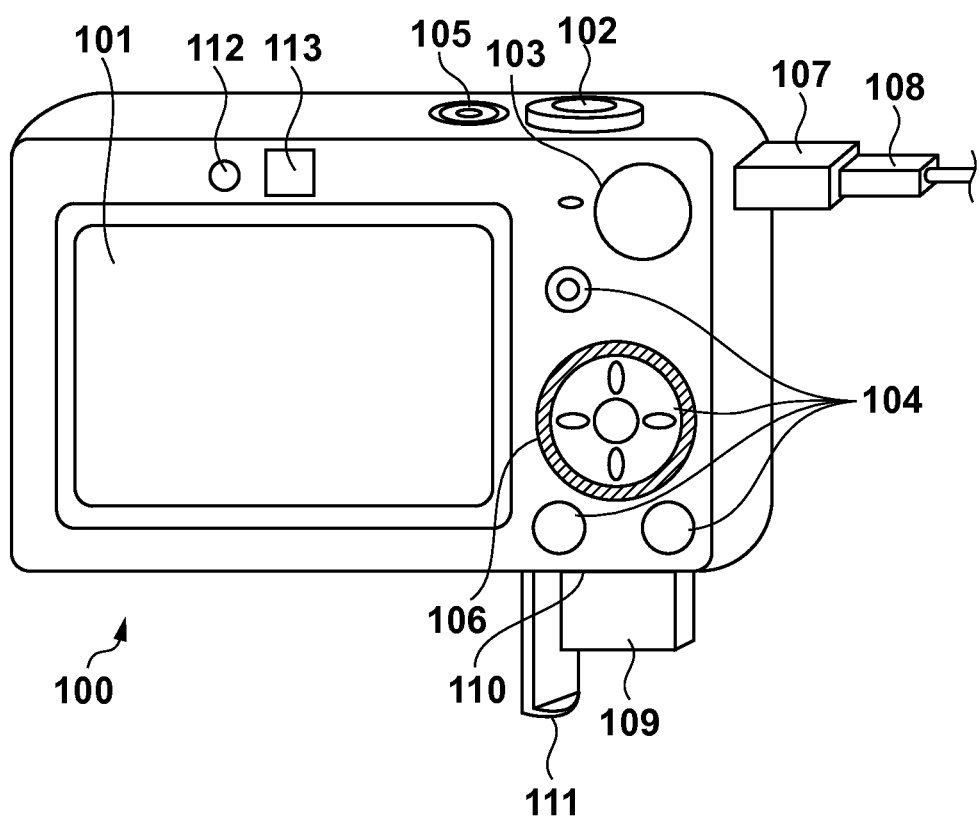
FIG. 1 is a diagram showing the external appearance of an image capturing apparatus according to an embodiment of the present invention.

FIG. 1 shows an external appearance of a digital camera 100 according to the present embodiment.

In FIG. 1, a display unit 101 is a display device such as an LCD panel which displays images and various information. A shutter button 102 is an operation unit for a shooting instruction. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110. A sub camera 112 is a camera module for shooting a photographer himself/herself or an object on the photographer side. A viewfinder 113 is provided for the photographer to shoot an object while seeing through the viewfinder, and includes an eye detection unit for detecting whether the photographer's eye is in contact with the viewfinder 113.

Figure 2:
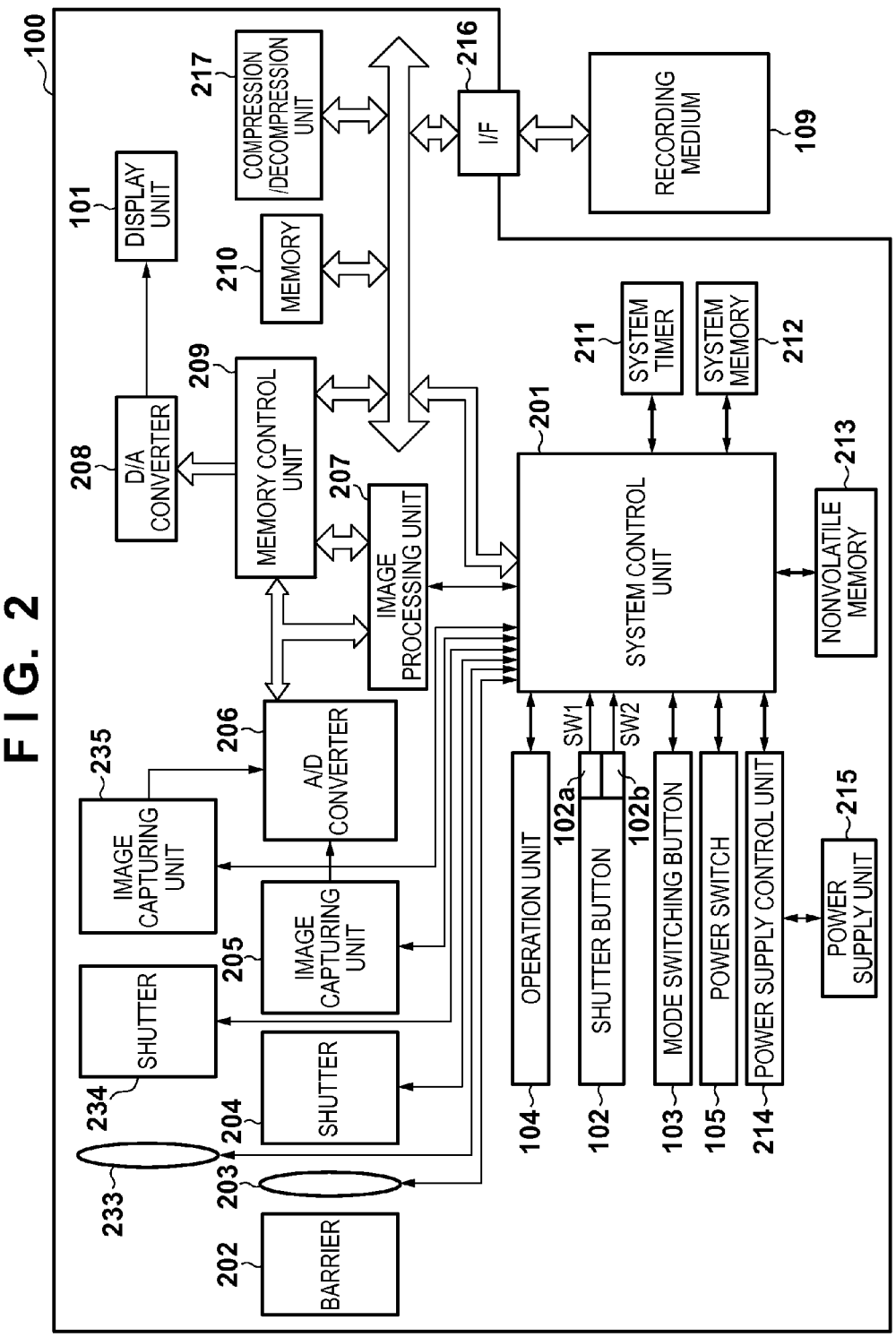
FIG. 2 is a block diagram showing a configuration of an image capturing apparatus according to an embodiment.

FIG. 2 shows an internal configuration of a digital camera 100 according to the present embodiment.

Referring to FIG. 2, the digital camera 100 according to this embodiment includes a main camera module (to be referred to as a main camera hereinafter) for shooting an object seen from the photographer, and a sub-camera module (to be referred to as a sub-camera hereinafter) for shooting the photographer himself/herself or an object on the photographer side. The main camera includes a first imaging optical system formed by a photographing lens 203, a shutter 204, and an image capturing unit 205. The sub camera includes a second imaging optical system formed by a photographing lens 233, a shutter 234, and an image capturing unit 235.

Each of photographing lenses 203, 233 includes a zoom lens and a focusing lens. Each of shutters 204, 234 has a diaphragm function. Each of image capturing units 205, 235 is an image sensor, which is constituted by a CCD or CMOS or the like, for converting the optical image of an object to an electric signal.

An A/D converter 206 converts analog signals, each of which is output from the image capturing units 205, 235, to a digital signal. A barrier 202 covers the imaging optical system which includes the photographing lens 203 of the part of the main camera of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

Note that the A/D converter 206 and image processing unit 207 can be provided in each of the image capturing units 205 and 235.

The data from the A/D converter 206 is directly written into a memory 210 via both the image processing unit 207 and the memory control unit 209 or via the memory control unit 209. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

A compression/decompression unit 217 compresses image data using an adaptive discrete cosine transform (ADCT) or the like, or decompresses compressed image data. Using the shutters 204, 234 as triggers, the compression/decompression unit 217 loads image data stored in the memory 210, performs compression processing thereon, and when the processing ends, writes the resulting image data in the memory 210. Also, if shooting has been performed in a later-described simultaneous shooting mode, according to later-described layer priority levels determining the vertical relationship at a time of display, the memory control unit 209 composites a first image shot by the main camera (to be referred to as a main camera image hereinafter) and a second image shot by the sub camera (to be referred to as a sub camera image hereinafter) that are stored in the memory 210, and when the compression processing by the compression/decompression unit 217 ends, the resulting composite image data is written in the memory 210. Also, the compression/decompression unit 217 performs decompression processing on image data that has been recorded in the recording medium 109 as a file and writes the image data in the memory 210 when the processing ends. The image data written in the memory 210 by the compression/decompression unit 217 is written in the recording medium 109 as a file by the system control unit 201 via the recording medium I/F 216.

The memory 210 also functions as a memory for image display (video memory). A D/A converter 208 converts the image display data stored in the memory 210 into an analog signal and supplies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. The digital signal once converted by the A/D converter 206 and stored in the memory 210 is converted into analog signals by the D/A converter 208, and the analog signals are successively transmitted to the display unit 101 so as to be displayed thereon, making it possible to realize an electronic view finder (EVF) functionality and to perform through-the-lens display of a live view image (hereinafter, live image).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 overall controls the entire camera 100, and realizes, by executing the programs stored in the nonvolatile memory 213, the processes of the flowchart that will be described later. The system memory 212 is, for example, a RAM on which constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, a simultaneous shooting mode in which the main camera and sub camera can simultaneously perform shooting, and the like. Using the mode switching button 103, the mode is directly switched to any of the plurality of modes included in the still image recording mode. Alternatively, it is also possible to switch, using the mode switching button 103, to the still image recording mode and then to switch, using another operation member, to any of the plurality of modes included in the still image recording mode. Similarly, also the moving image recording mode may include a plurality of modes.

While the shutter-release button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the main camera and sub camera to start the AF (Automatic Focus) processing, the AE (Automatic Exposure) processing, the AWB (Automatic White Balance) processing, the EF (flash pre-emission) processing and the like.

When the operation of the shutter-release button 102 is completed, that is, the shutter-release button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from each of the image capturing units 205, 235 to writing of image data to the recording medium 109.

By selecting various functional icons displayed on the display unit 101, appropriate functions for each situation are assigned to each operation member of the operation units 104, and the operation members thus act as various function buttons. Examples of these function buttons include an end button, a back button, an image scrolling button, a jump button, a narrow-down button, an attribute change button. For example, a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 itself is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor.

The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

Basic Operation

The basic operation of the digital camera 100 according to this embodiment from the start to the end will be described with reference to FIG. 3. Note that processing shown in FIG. 3 is implemented when a program recorded in the nonvolatile memory 213 is read out into the system memory 212, and executed by the system control unit 201.

Further, although the sub camera performs operations that are basically the same as those of the main camera as will be described later, a description will be given in which processing that is unique to the sub camera in particular is supplemented.

Figure 3:
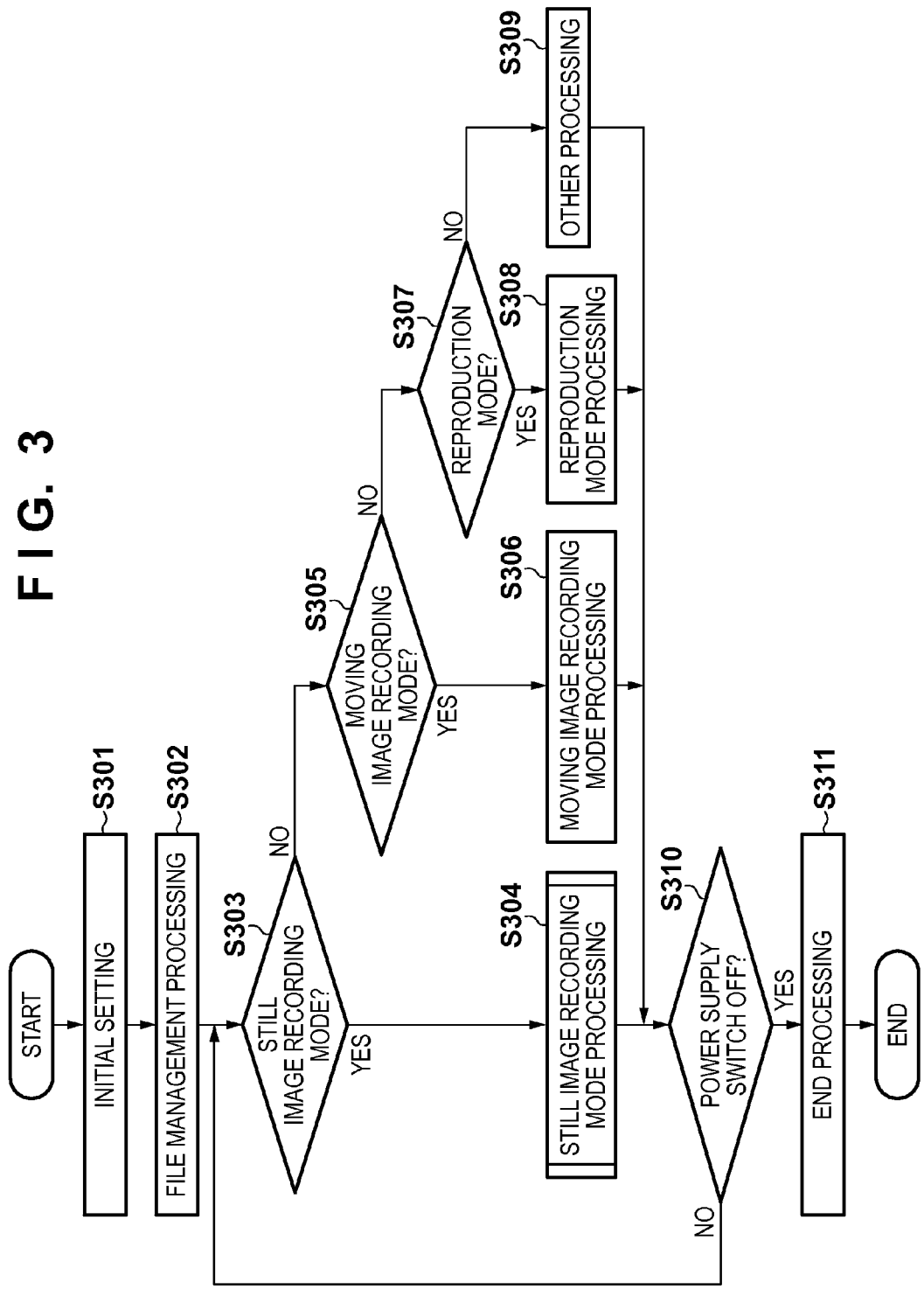
FIG. 3 is a flowchart showing a basic operation of an image capturing apparatus according to an embodiment.

Upon turning on the power switch 105 of the digital camera 100, the processing shown in FIG. 3 starts.

The system control unit 201 initializes the flags, control variables, and the like in step S301 and starts management processing for files recorded in the recording medium 109 in step S302.

Figure 4:
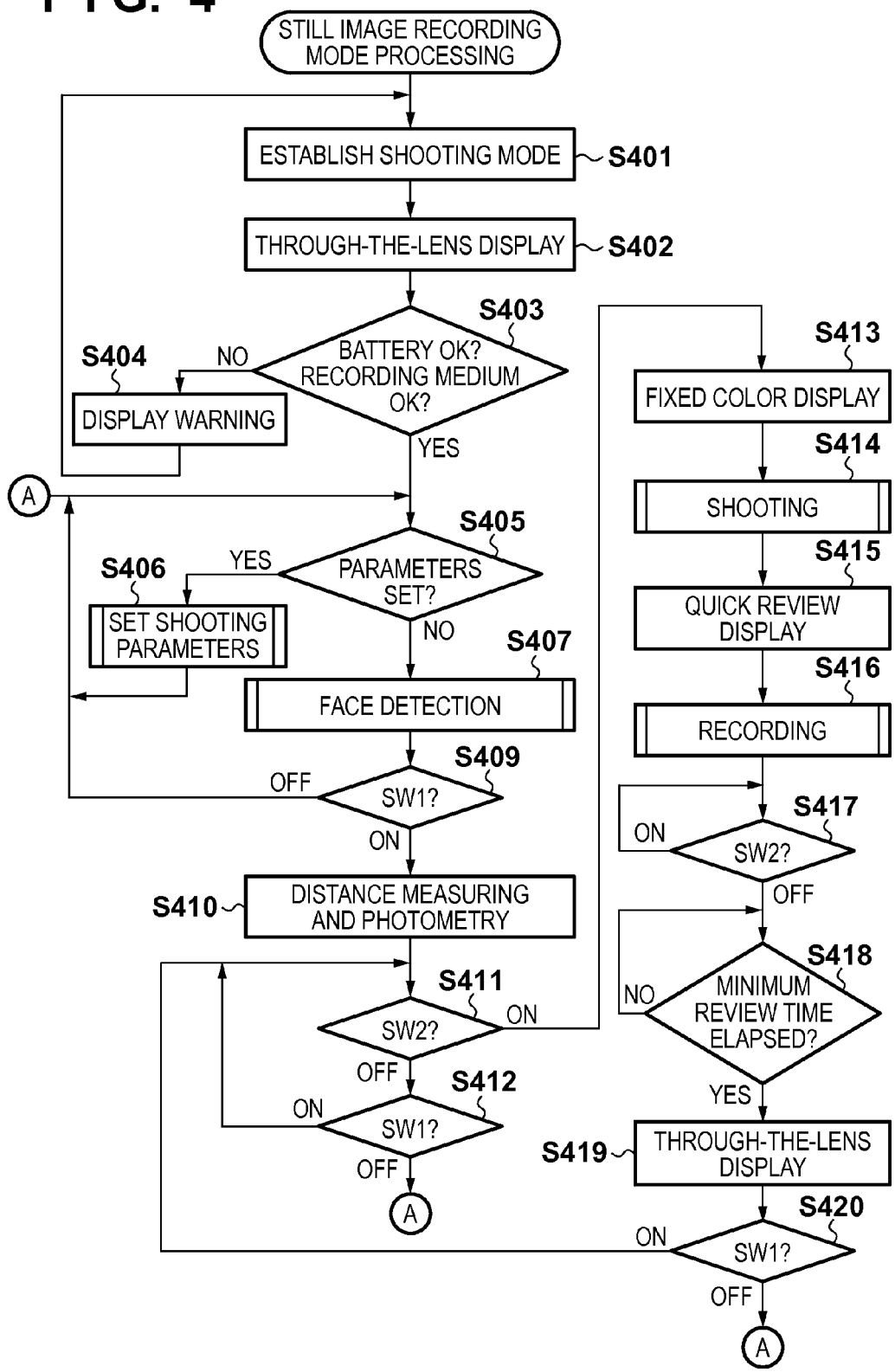
FIG. 4 is a flowchart showing an operation in a still image recording mode of an image capturing apparatus according to an embodiment.

In steps S303, S305, and S307, the system control unit 201 determines the setting position of the mode switching button 103. If it has been set to the still image recording mode in step S303, the process advances to step S304, and the still image recording mode processing that will be described later in FIG. 4 is executed. Also, if it has been set to the moving image recording mode in step S305, the process advances to step S306, and the moving image recording mode processing is executed. Also, if it has been set to the reproduction mode in step S307, the process advances to step S308, and the reproduction mode processing is executed.

Also, if none of the still image recording mode, the moving image recording mode, and the reproduction mode have been set in steps S303, S305, and S307, the process advances to step S309, and the system control unit 201 executes other mode processing. The other mode processing is, for example, transmission mode processing in which transmission of a file recorded in the recording medium 109 is performed, reception mode processing in which a file is received from an external device and recorded in the recording medium 109, or the like.

After the mode processing is executed in step S304, S306, S308, S309, the process advances to step S310 and the system control unit 201 determines the setting of the power supply switch 105, and if it is set to be on, the process returns to step S303, and if it is set to be off, the process advances to step S311.

In step S311, the system control unit 201 performs end processing. End processing includes, for example, processing for changing the display of the display unit 101 to an end state and closing the barrier 202 to protect the image capturing unit 205, and processing for recording setting values, setting modes, and parameters including flags, control variables, and the like in the nonvolatile memory 213 and shutting off the power to units that do not require a supply of power.

Upon completion of the end processing in step S311, a transition to the power off state is made.

Still Image Recording Mode

The still image recording mode processing of step S304 in FIG. 3 will be described with reference to FIGS. 4 and 5A-5C. Note that the processing in FIG. 4 ends due to interruption processing and the like in the case where a switch to another operation mode is instructed using the mode switching button 103 or in the case where the power supply switch 105 is switched off.

In step S401, the system control unit 201 establishes the shooting mode. Establishment of the shooting mode is performed by acquiring the shooting mode at the time of ending the previous instance of still image recording mode processing from the nonvolatile memory 213 and storing the shooting mode in the system memory 212. A shooting mode is for shooting a still image. The digital camera 100 of the present embodiment has the following shooting modes.

Automatic shooting mode: a mode in which various parameters of the camera are automatically determined by a program installed in the digital camera 100, based on an exposure value obtained by photometry.

Manual mode: a mode in which the user can freely change various parameters of the camera.

Scene mode: the combination of the shutter speed, diaphragm value, strobe light state, sensitivity setting, and the like that are appropriate for the shooting scene are set freely.

Simultaneous shooting mode: a mode in which shooting with the sub camera is also performed at the same time as shooting with the main camera and one composite image is generated by superimposing the sub camera image on the main camera image.

In step S402, the system control unit 201 performs through-the-lens display of image data shot using the image capturing unit 205 on the display unit 101. Note that in the case of the simultaneous shooting mode, which will be described later with reference to FIG. 6, the main camera image and the sub camera image shot by the image capturing units 205, 235 are composited by the memory control unit 209, and an almost real-time live image thereof is subjected to through-the-lens display without being stored in the recording medium 109. By viewing the composite image, the photographer can check the angle of view and adjust the timing of shooting, and can check his/her own expression in conjunction therewith.

In step S403, the system control unit 201 uses the power supply control unit 214 to determine whether or not the residual capacity of the power supply unit 215, the existence or non-existence of the recording medium 109, or the residual capacity thereof is problematic for the operation of the digital camera 100. If it is problematic, the process advances to step S404, a predetermined warning is displayed on the display unit 101 using an image or audio, and the process returns to step S401, and if it is not problematic, the process advances to step S405.

In step S405, the system control unit 201 expands the shooting settings stored in the nonvolatile memory 213 in accordance with user settings to the system memory 212 so as to determine whether or not shooting parameters have been set. If they have not been set, the process advances to step S407, and if they have been set, the process advances to step S406 and processing is performed in accordance with the set shooting parameters.

In step S407, the system control unit 201 detects a face of a person in the live image being subjected to through-the-lens display (face detection processing). If the face of a person is detected in the face detection processing, the system control unit 201 stores the positional coordinates, size (width, height), number detected, reliability coefficient, and the like of the detected face in the system memory 212 as face information. If a face is not detected in the face detection processing, 0 is set in regions for the positional coordinates, size (width, height), number detected, reliability coefficient, and the like of the system memory 212.

Here, the face detection processing in step S407 will be described with reference to FIG. 5A.

In FIG. 5A, the system control unit 201 reads out the live image data (step S531) stored in the memory 210, applies band pass filters in the horizontal direction and the vertical direction (steps S532 and S533), and detects edge components. Next, the system control unit 201 performs pattern matching on the detected edge components (step S534) so as to extract a group of candidates for eyes, nose, mouth, and ears. Next, the system control unit 201 determines that among the group of candidates for eyes extracted using pattern matching, candidates that satisfy a predetermined condition (e.g., distance between two eyes, inclination, etc.) are a pair of eyes, and the group of candidates for eyes is narrowed down to only those that are a pair of eyes (step S535).

Then, the system control unit 201 detects a face by associating the narrowed-down group of candidates for eyes with other parts forming a face (nose, mouth, ears) that correspond thereto and passing them through a pre-set non-face condition filter (step S536), and face information is generated in accordance with the detection result (step S537).

Object information can be generated by extracting feature amounts of an object such as a person's face from the live image data being subjected to through-the-lens display in this way. Note that in order to notify the user of the generated object information, a face frame and the like may be displayed on the display unit 101 in accordance with the positional coordinates and the size of the face by superimposing them on the live image, for example. In the present embodiment, face information is illustrated as object information, but the present invention is not limited to this, and it is possible to detect a moving object such as a vehicle or a train for example as an object being trailed.

In step S409, the system control unit 201 determines whether or not a first shutter switch signal SW1 is on (receive shooting preparation instruction). If the first shutter switch signal SW1 is off, the process returns to step S405, whereas if it is on, the process advances to step S410.

In step S410, a shooting preparation operation is performed. The system control unit 201 performs distance measuring processing so as to focus the photographing lens 203 on the object (AF processing) and performs photometry processing so as to determine the diaphragm value and shutter speed (AE processing). Note that in the photometry processing, flash settings are also performed if necessary. Also, if a face is detected in step S407, it is possible to perform face AF in which distance measurement is performed using the detected range of the face, and to display an AF frame on a specific face indicating the focus position. Also, in the case of simultaneous shooting mode, a shooting preparation operation is performed similarly on the sub camera side as well.

In steps S411, S412, the system control unit 201 determines the on/off state of the first shutter switch signal SW1 and the second shutter switch signal SW2. If the second shutter switch signal SW2 switches on when the first shutter switch signal SW1 is on, the process advances to step S413. Thereafter, upon the first shutter switch signal SW1 switching off (if the first shutter switch signal SW1 is switched off while the second shutter switch signal SW2 is not on), the process returns to step S405. Also, while the first shutter switch signal SW1 is on and the second shutter switch signal SW2 is off, the processing of steps S411, S412 is repeated.

In step S413, the system control unit 201 sets the display unit 101 from a through-the-lens display state to a fixed color display state (e.g., a solid black display).

In step S414, the system control unit 201 executes shooting processing which includes exposure processing and developing processing. In the exposure processing, image data obtained from the image capturing unit 205 and the A/D converter 206 is written in the memory 210 via both the image processing unit 207 and the memory control unit 209, or from the A/D converter 206 via the memory control unit 209 directly. Also, in the developing processing, the system control unit 201 performs various processing by reading out image data written in the memory 210 using the memory control unit 209 and, when necessary, the image processing unit 207.

Here, the shooting processing in step S414 will be described with reference to FIG. 5B.

In FIG. 5B, the system control unit 201 acquires the shooting date/time from the system timer 211 and stores it in the system memory 212 (step S541). Next, the system control unit 201 adjusts the diaphragm function of the shutter 204 according to the diaphragm value that was determined in step S410 and stored in the system memory 212, and starts exposure of the image capturing unit 205 (step S542, S543).

Upon ending the exposure of the image capturing unit 205 (step S544), the system control unit 201 closes the shutter 204 (step S545), reads out the charge signal from the image capturing unit 205, and writes the image data in the memory 210 via the A/D converter 206, the image processing unit 207, and the memory control unit 209, or from the A/D converter 206 via the memory control unit 209 directly (step S546).

Using the memory control unit 209, the system control unit 201 reads out the image data written in the memory 210 via the image processing unit 207 as needed, performs image processing such as compression processing using the compression/decompression unit 217 (step S547), and when the processing ends, the image data is sequentially written in the memory 210. In the case of the simultaneous shooting mode, after being subjected to compression processing, the main camera image and the sub camera image are composited and written in the memory 210.

In step S548, the system control unit 201 reads out the image data from the memory 210 using the memory control unit 209 and transfers the image data for display that has been converted into an analog signal by the D/A converter 208 to the display unit 101. Thus, the image data that was written in the memory 210 is displayed on the display unit 101 via the D/A converter 208.

In step S415, the system control unit 201 performs quick review display of image data obtained using the shooting processing of step S414. Quick review display is processing for displaying image data for a predetermined period of time (review time) on the display unit 101 after shooting the object and before recording it in the recording medium in order to check the shot image.

In step S416, the system control unit 201 writes the image data obtained using the shooting processing of step S414 in the recording medium 109 as a file. In the case of the simultaneous shooting mode, the sub camera image data shot by the sub camera is recorded in the recording medium 109 in association with the main camera data.

Here, the recording processing in step S416 will be described with reference to FIG. 5C.

In FIG. 5C, the system control unit 201 generates a file name in accordance with a predetermined file name generation rule (step S551) and acquires shooting date/time information stored in the system memory 212 in the shooting processing of step S414 (step S552). Next, the system control unit 201 acquires the file size of the image data (step S553) and determines whether or not the directory in which the file is stored exists in the recording medium 109 (step S554). If it is determined that the directory does not exist, the process advances to step S555, and if it does exist, the process advances to step S556.

In step S555, the system control unit 201 generates a directory such as 100GANON in the recording medium 109, for example.

In step S556, the system control unit 201 generates a file header constituted by the shooting date/time, file size, shooting conditions, and the like of the image data obtained with the shooting processing of step S414.

In step S557, the system control unit 201 generates a directory entry using the file name, shooting date/time, and data amount generated and/or acquired in steps S551 to S553 and writes the image data in the recording medium 109 as a file.

In step S417, the system control unit 201 determines the on/off state of the second shutter switch signal SW2 and waits for the second shutter switch signal SW2 to switch off. The quick review display is continued until the second shutter switch signal SW2 switches off. In other words, when the recording processing of step S416 ends, the quick review display on the display unit 101 is continued until the second shutter switch signal SW2 is switched off. With such a configuration, the user can carefully check shot image data using the quick review display by continuing to fully press the shutter-release button 102. Upon the second shutter switch signal SW2 switching off in step S417, or in other words, upon the user canceling the fully-pressed state by removing his or her finger from the shutter-release button 102 or the like, the process advances to step S418.

In step S418, the system control unit 201 determines whether or not a predetermined amount of review time for the quick review display has elapsed. If the review time has not elapsed, the system control unit 201 waits for the review time to elapse, and upon the review time elapsing, the process advances to step S419.

In step S419, the system control unit 201 returns the display unit 101 from the quick review display to the through-the-lens display state. With this processing, after the image data has been checked using the quick review display, the display state of the display unit 101 automatically switches to the through-the-lens display state in which the image data captured by the image capturing unit 205 is successively displayed for the next shooting.

In step S420, the system control unit 201 determines the on/off state of the first shutter switch signal SW1, and if it is on, the process returns to step S411, and if it is off, the process returns to step S405. In other words, if the shutter-release button 102 continues to be half-pressed (if the first shutter switch signal SW1 is on), the system control unit 201 prepares for the next shooting (step S411). On the other hand, if the shutter-release button 102 is released (the first shutter switch signal SW1 is off, the series of shooting operations are ended and the shooting standby state is returned to (step S405).

Live Image Display Processing

Live image through-the-lens display processing during simultaneous shooting mode in step S402 in FIG. 4 will be described next with reference to FIGS. 6 to 10A and 10B.

Figure 6:
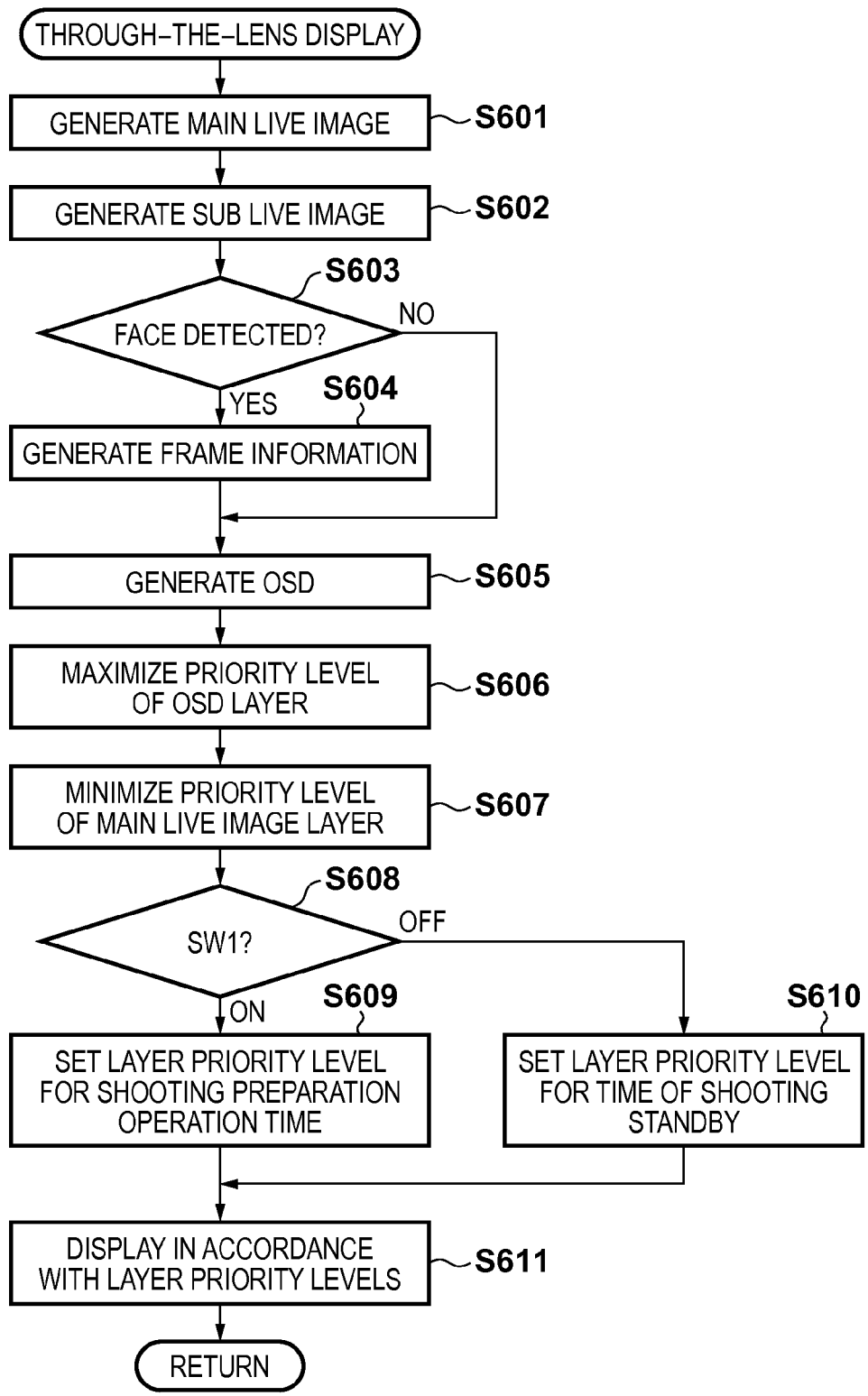
FIG. 6 is a flowchart showing through-the-lens display control processing in a simultaneous shooting mode according to an embodiment.
Figure 7A:
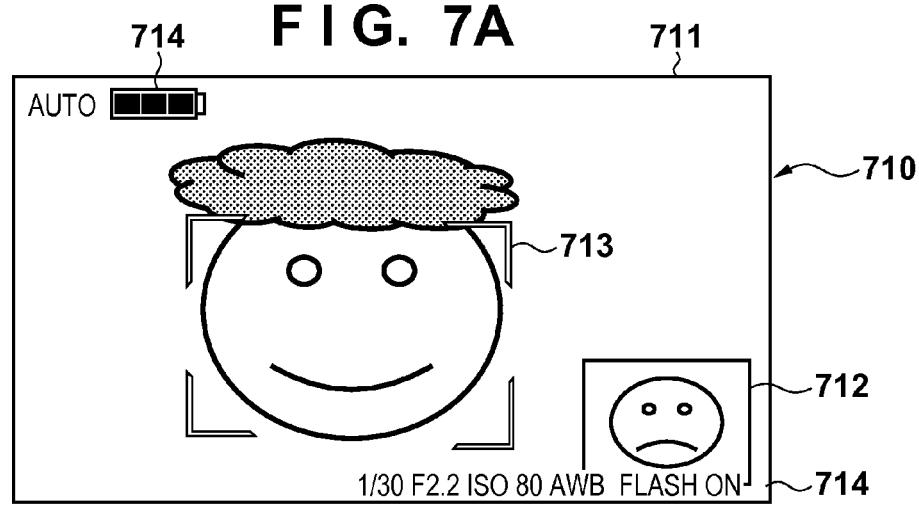
FIGS. 7A to 7C are diagrams illustrating a live view screen in a simultaneous shooting mode according to an embodiment.

Upon switching the power supply of the digital camera 100 on in the simultaneous shooting mode or switching from another mode to the simultaneous shooting mode, the processing in FIG. 6 is started. In simultaneous shooting mode, as shown in FIG. 7A, a first live image (to be referred to as a main live image hereinafter) 711 shot by the main camera and a second live image (to be referred to as a sub live image hereinafter) 712 shot by the sub camera are displayed on a live view screen 710.

As shown in FIG. 6, in steps S601, S602, using the image processing unit 207, the system control unit 201 generates the main live image 711 and the sub live image 712 based on the main camera image data and the sub camera image data stored in the memory 210.

In step S603, if a face is detected as a result of the face detection in step S407 in FIG. 4 with respect to the main camera image data, the system control unit 201 moves to step S604, and if a face is not detected, moves to step S605.

In step S604, according to the positional coordinates and the size (width, height) of the detected face, the system control unit 201 generates frame information (first information) for displaying and superimposing the face frame 713 on the main live image 711 of the live view screen 710.

In step S605, the system control unit 201 generates OSD data (second information) composed of an icon, character string, and the like for displaying an OSD (on-screen display) 714 for shooting parameters and the like on the live view screen 710. The shooting mode, battery remaining amount, shutter speed, exposure value, ISO sensitivity, white balance, flash on/off and the like are examples of OSD data.

As described above, in steps S601 to S605, upon the information regarding the main live image 711, the sub live image 712, the face frame 713 and the OSD 714 being generated, the system control unit 201 determines the priority levels of the layers at the time of displaying these items on the display unit 101. Note that the priority levels of the layers indicate the vertical relationship of the main live image 711, the sub live image 712, the face frame 713, and the OSD 714 which displayed and superimposed, a layer being arranged further upward the higher its priority level is.

In steps S606, S607, the system control unit 201 sets the priority level of the layer for the OSD 714 such that it is at the top and sets the priority level of the layer for the main live image 711 such that it is on the bottom. This is because if the main live image 711 is not displayed on the bottom layer, the sub live image 712 and the OSD 714 will be hidden from view due to the fact that the main live image 711 is to be displayed in almost the entirety of the live view screen 710.

In step S608, the system control unit 201 determines the on/off state of the first shutter switch signal SW1, and if it is on (during a shooting preparation operation), the process advances to step S609, and if it is off (during shooting standby), the process advances to step S610.

Figure 7B:
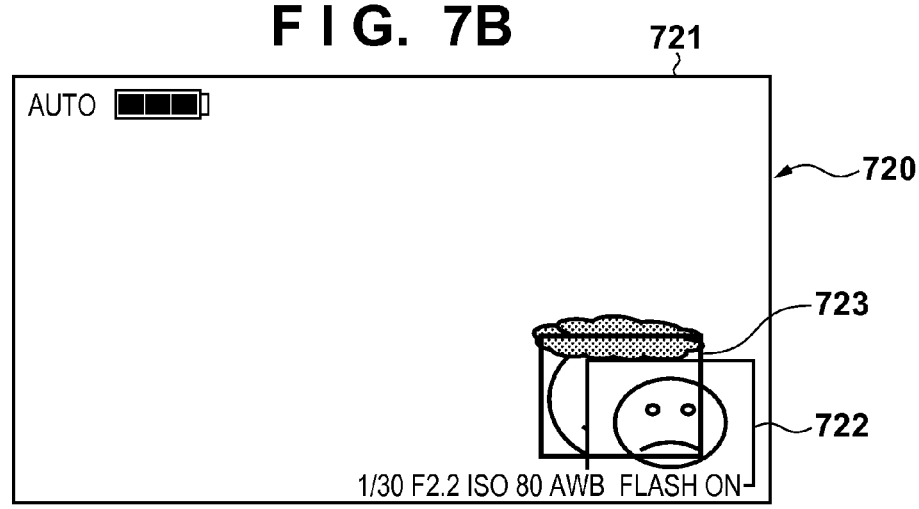

In step S609, as shown in FIG. 7B, the system control unit 201 sets the layer priority levels for the shooting preparation operation time such that the layer priority level of the face frame 723 is higher than the layer priority level of the sub live image 722. During the shooting preparation operation, since the face frame 723 needs to be checked and the photographer views the face frame 723 and performs the final shooting instruction, the layer priority levels are set such that the face frame 723 is displayed on the sub live image 722. FIG. 10B illustrates a layer configuration for displaying the live view screen 720 in FIG. 7B. In the shooting preparation state, the priority level of a layer 1022 for the face frame is set to be second, and the priority level of a layer 1023 for the sub live image is set to be third.

Figure 7C:
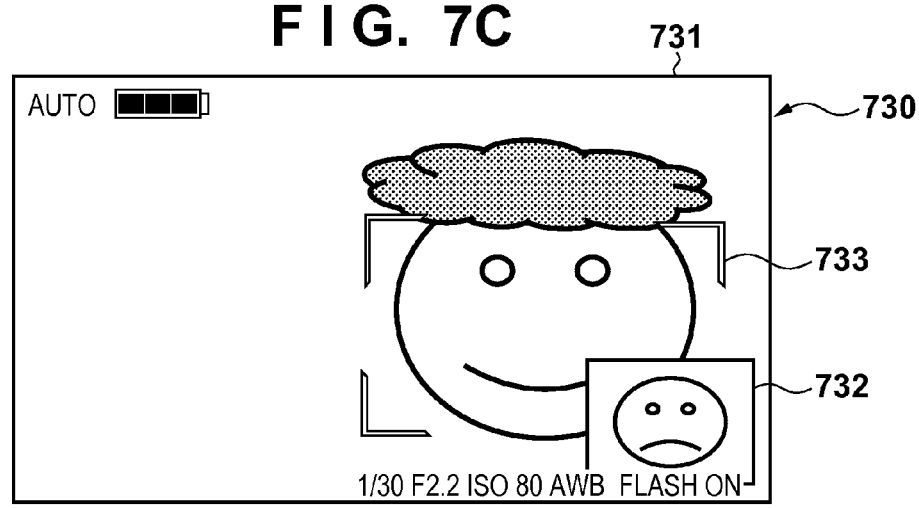

On the other hand, in step S610, as shown in FIG. 7C, the system control unit 201 sets the layer priority levels during shooting standby such that the layer priority level of the sub live image 732 is higher than the layer priority level of the face frame 733. During shooting standby, the position of the face frame 733 is moved/changed, and since the layer for the face frame 733 is not very important until the position of the face frame is finally established, the layer priority levels are set such that the layer for the face frame 733 is displayed behind that of the sub live image 732. FIG. 10A illustrates a layer configuration for displaying the live view screen 730 in FIG. 7C. During shooting standby, the priority level of a layer 1012 for the sub live image is set to be second, and the priority level of a layer 1013 for the face frame is set to be third.

In step S611, the system control unit 201 displays and superimposes the images of all layers and the OSD on the display unit 101 in accordance with the layer priority levels that were set in step S609 or step S610. Note that during shooting standby in FIG. 10A and during the shooting preparation operation in FIG. 10B, the priority levels of layers 1011 and 1021 for the OSD are set to be the highest, and layers 1014 and 1024 for the main live images are set to be the lowest, according to steps S606, S607.

Note that regarding the method for setting the layer priority levels during shooting standby in step S610, various methods are conceivable, such as (1) a case in which the priority levels are fixed, (2) a case in which they are determined according to the coordinate positions, size, and the like of the face in the main live image, and (3) a case in which they are presented selectably to the user.

In case (1) above, as with the live view screen 730 shown in FIG. 7C of the shooting standby, the sub live image 732, which has been hidden behind the face frame 733 of the main live image 731 and entirely invisible during the standby preparation operation, will become visible, and therefore the photographer can check his/her own expression and the like.

Figure 8A:
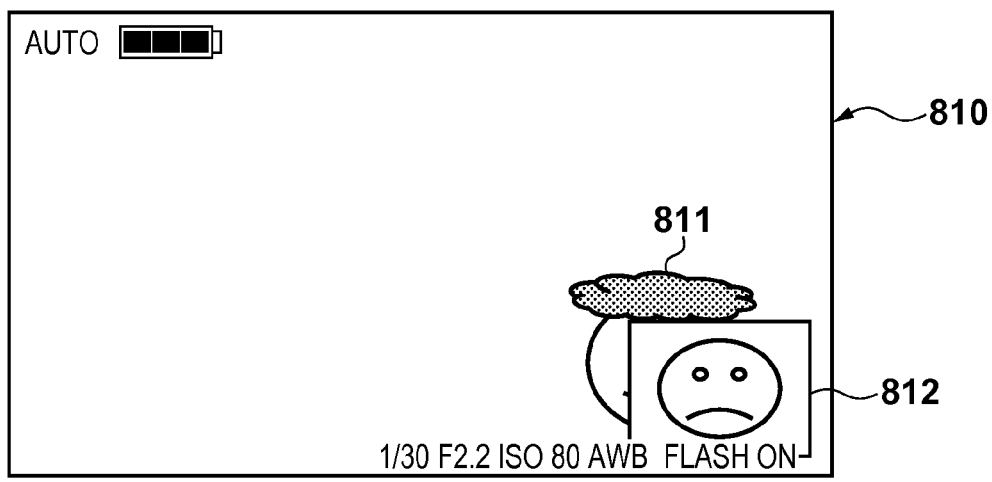
FIGS. 8A and 8B are diagrams illustrating a live view screen in a simultaneous shooting mode according to an embodiment.
Figure 8B:
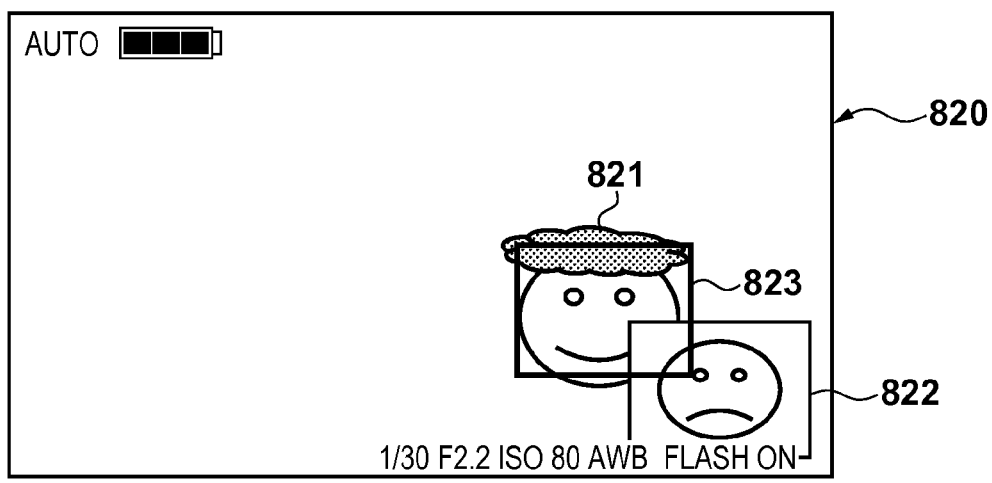

In case (2) above, as shown in the live view screens 810, 820 in FIGS. 8A and 8B, the layer priority levels are determined according to the range in which the sub live image 812 and the face region 811 in the main live image are superimposed. For example, as shown in FIG. 8B, if the area of the region in which the face 821 that is to be displayed in the face frame 823 and the sub live image 822 are superimposed is less than a predetermined size, the layer priority level of the face frame 823 is made higher than the layer priority level of the sub live image 822. On the other hand, as shown in FIG. 8A, if the area of the region in which the face 811 and the sub live image 812 are superimposed is greater than or equal to a predetermined size, the layer priority level of the face frame is made lower than the layer priority level of the sub live image 812. Note that the layer priority level may be determined according to at least one of the coordinate position and the size of the face in the main live image. In such a case, for example, if the size of the face in the main live image is large enough to cover the entire image, it is possible to set the face frame in a layer below that of the sub live image regardless of the face position. Also, for example, if the position of the face being displayed in the face frame in the main live image is far away from the sub live image, the face frame may be set to be above the sub live image regardless of the face size.

In case (3) above, the user selects menu items 911, 912 from a layer priority level setting screen 910 shown in FIG. 9A and sets in advance whether to make the layer priority level of the face frame or the sub live image higher. For example, if the user selects face frame layer 911 on the layer priority level setting screen 910 in FIG. 9A, during shooting standby, the layer priority level for the face frame will always be higher than the layer priority level for the sub live image. On the other hand, if sub live image layer 912 is selected, the layer priority level for the sub live image is raised. Thus, it is possible to increase the range of selection according to the user's preference. Other methods are also considered as methods for determining the layer priority level, and any of such methods may be used. Also, the user may select menu items 921, 922, 923 from a layer priority level setting screen 920 shown in FIG. 9B, for example, so as to raise the layer priority level of one of the face frame and the sub live image, or to determine the layer whose priority level is to be raised according to a condition. If the user selects conditional priority 922 in the layer priority level setting screen 920 in FIG. 9B, the camera automatically selects which of the layer priority level of the face frame and the layer priority level of the sub live image is to be raised according to conditions during a shooting operation. On the other hand, if the face frame layer priority 921 or the sub live image layer 923 is selected, the user can arbitrarily determine which of the layer priority levels he/she wishes to raise.

As described above, according to the present embodiment, the vertical positional relationship between the main live image, the face frame, the sub live image, and the OSD, which are superimposed and displayed, can be switched according to the shooting state. By doing so, the photographer can check the object that is being focused on, along with the object, his/her own expression, and the like, and shooting can be performed at an appropriate timing.

Also, although an image capturing apparatus to which the present invention is applied was described as an example in the above embodiments, the present invention may be carried out using an electronic device such as a mobile phone with a camera, a mobile game device, or the like. Also, rather than implementing the functions of the above-described embodiments using one apparatus, the present invention may be implemented using a system in which a plurality of apparatuses, for example, an image capturing apparatus having a plurality of image capturing units, a display apparatus having a display unit, and a control apparatus that has a control unit and controls the image capturing apparatus and the display apparatus are connected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-266131, filed Dec. 24, 2013 which is hereby incorporated by reference herein in its entirety.

What is claimed is:

1. An image capturing apparatus comprising:
a first image capturing unit;
a second image capturing unit that is different from the first image capturing unit; and
a control unit configured to perform control such that a second live image captured by the second image capturing unit is superimposed and displayed on a first live image captured by the first image capturing unit,
wherein if first information is to be displayed on a display unit along with the first live image and the second live image, the control unit controls to select a display state in which the first information is superimposed on the second live image or a display state in which the first information is displayed behind the second live image, according to a state of a predetermined function for shooting.

2. The apparatus according to claim 1, wherein the first image capturing unit captures an image on an object side and the second image capturing unit captures an image on a photographer side.

3. The apparatus according to claim 1, wherein the control unit performs control such that in the case of a shooting standby state, the first information is displayed behind the second live image, and in the case of a shooting preparation state, the first information is displayed on the second live image.

4. The apparatus according to claim 1, further comprising: a processing unit configured to, in response to a predetermined operation being received in a shooting standby state, execute autofocus processing on the first image capturing unit, wherein the control unit performs control such that in the case of the shooting standby state, the first information is displayed behind the second live image, and if the autofocus processing has been performed by the processing unit, the first information is displayed on the second live image.

5. The apparatus according to claim 1, wherein the control unit performs control such that second information is further displayed on the display unit, and the second information is displayed on the second live image regardless of the state of the predetermined function.

6. The apparatus according to claim 1, further comprising: a recording unit configured to, in response to a shooting instruction, record the images captured by the first image capturing unit and the second image capturing unit in association with each other.

7. The apparatus according to claim 1, wherein the first information includes information relating to an object in the first live image, and information indicating a position of an object or a focus position of an object.

8. The apparatus according to claim 1, wherein the predetermined function is a function of specifying the position of the object in the first live image in order to perform a shooting operation, and in accordance with the position of the object specified using the predetermined function, the control unit performs displaying the first information on the second live image or displaying the first information behind the second live image.

9. The apparatus according to claim 1, wherein
the first information is information indicating an object in the first live image, and
in accordance with the position or size of the object in the first live image, the control unit performs displaying the first information on the second live image or displaying the first information behind the second live image.

10. The apparatus according to claim 1, wherein the second information includes information relating to shooting set in the image capturing apparatus.

11. The apparatus according to claim 1, wherein in the case where the state of the predetermined function is a shooting standby state, the control unit performs control such that if the area of a region in which the object in the first live image and the second live image are superimposed is less than a predetermined size, the first information is displayed on the second live image, and if the area of the region in which they are superimposed is greater than or equal to a predetermined size, the first information is displayed behind the second live image.

12. The apparatus according to claim 1, further comprising: a presentation unit configured to selectably present to the user a setting for displaying the first information on the second live image or displaying the first information behind the second live image.

13. The apparatus according to claim 1, further comprising:
a display data generation unit configured to generate first image display data, second image display data, and first information display data,
wherein the control unit performs control such that the first image display data, the second image display data and the first information display data are superimposed and displayed, and controls a superposing manner of the first image display data, the second image display data and the first information display data in accordance with a state of a predetermined function relating to shooting when the display data are superimposed.

14. A control method of a display control apparatus for displaying an image captured by a first image capturing unit and an image captured by a second image capturing unit for capturing an image in a direction different from that of the first image capturing unit, the method comprising:
a control step of performing control such that a first live image captured by the first image capturing unit, a second live image captured by the second image capturing unit, and first information are displayed on the display unit,
wherein in the control step, the second live image is superimposed and displayed on the first live image, and according to a state of a predetermined function related to shooting, it is controlled to select a display state in which the first information is superimposed on the second live image or a display state in which the first information is displayed behind the second live image.

15. A non-transitory computer-readable storage medium storing a program for causing a computer to execute a control method of a display control apparatus for displaying an image captured by a first image capturing unit and an image captured by a second image capturing unit for capturing an image in a direction different from that of the first image capturing unit, the method comprising:
a control step of performing control such that a first live image captured by the first image capturing unit, a second live image captured by the second image capturing unit, and first information are displayed on the display unit, wherein in the control step, the second live image is superimposed and displayed on the first live image, and according to a state of a predetermined function related to shooting, it is controlled to select a display state in which the first information is superimposed on the second live image or a display state in which the first information is displayed behind the second live image.

* * * * *